METHOD OF SOLDERING A PLURALITY CLOSELY SPACED ELECTRICAL CONNECTIONS

Filed Feb. 10, 1956

INVENTOR.
Francis R Young
BY
Ralph Hammar
Attorney 2,870,532

METHOD OF SOLDERING A PLURALITY CLOSELY SPACED ELECTRICAL CONNECTIONS

Francis R. Young, Erie, Pa., assignor to Erie Resistor Corporation, Erie, Pa., a corporation of Pennsylvania Application February 10, 1956, Serial No. 564,696

5 Claims. (Cl. 29—471.1)

Figures 1, 2, 3, 4:
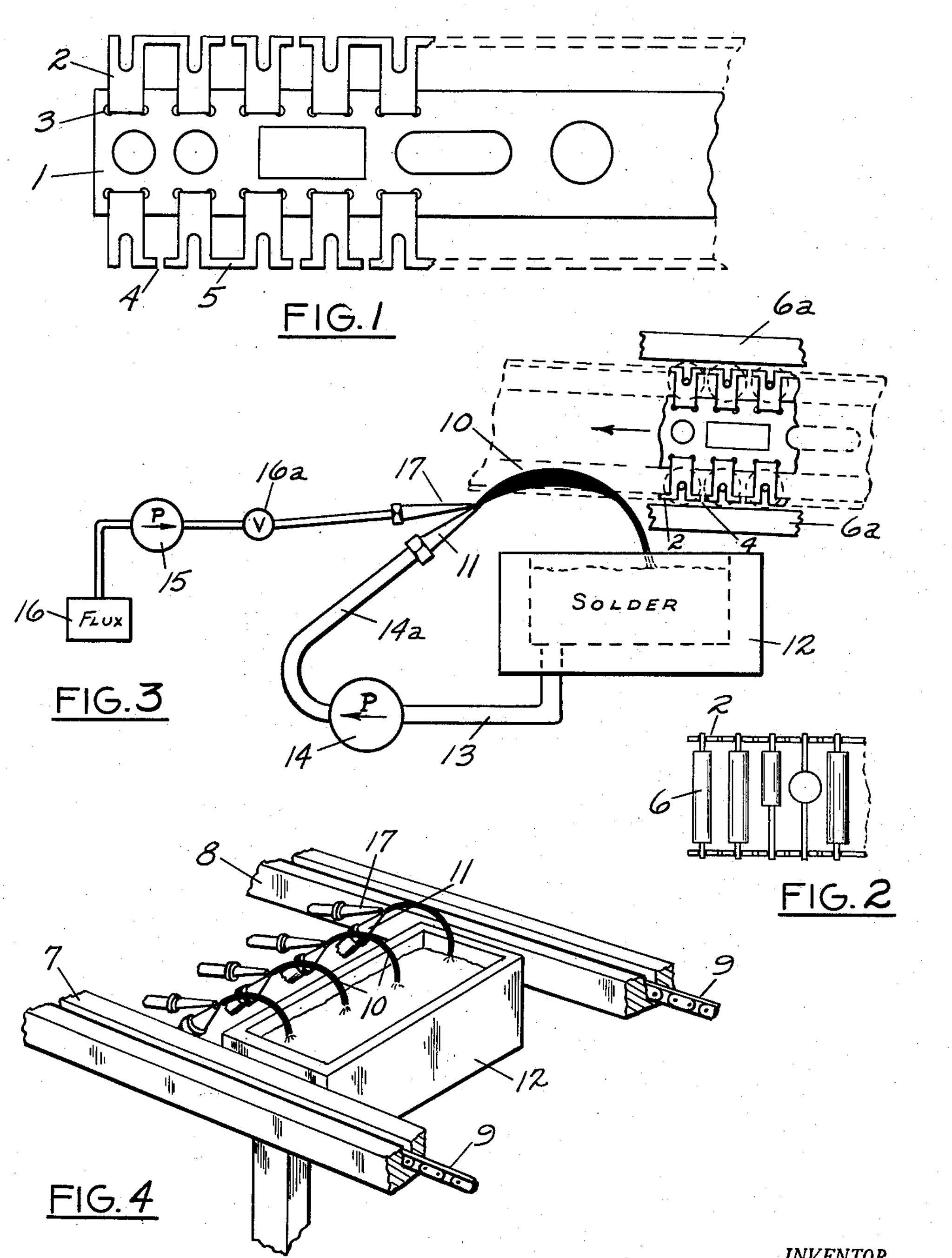

This invention is intended to solder circuit connections or joints automatically and is particularly advantageous in circuit assemblies where the circuit elements are arranged so the joints are in rows. Then the assemblies can be moved by a conveyor so as to bring the joints in each row successively into the path or trajectory of a stream of solder flowing from a nozzle which discharges along each row. Flux is discharged onto the stream of solder as it emerges from the nozzle, thereby preventing oxidation of the surface of the solder stream and eliminating the need for additional fluxing of the joints unless the joints are very dirty.

In the accompanying drawing, Fig. 1 is a side view of one form of terminal strip for making connections to a plurality of electric circuit elements; Fig. 2 is a top plan view of two terminal strips with typical electric circuit elements arranged therebetween; Fig. 3 is a diagrammatic view of apparatus for automatically making soldered connections between the circuit element leads and the terminals of the strips; and Fig. 4 is a perspective view partly broken away of apparatus for automatically soldering four rows of electric connections.

Electric circuit assemblies have been made in which a plurality of electric circuit elements such as resistors, capacitors, diodes, etc., are arranged side by side in rows between spaced terminal strips. In such circuit assemblies, the connections between the circuit elements and the terminal strips are likewise in rows. In some cases the terminal strips are arranged to make connections between adjacent elements. While this construction has the parts arranged in an orderly manner which facilitates manufacture and inspection, there are a great many soldered connections to be made which is time consuming.

Figs. 1 and 2 illustrate parts heretofore described in making electric circuit assemblies. In Fig. 1, there is a terminal strip 1 of insulating material having along opposite edges terminals 2 which are suitably fastened to the strip, for example, by stapling at 3. In some cases, there is a space 4 between adjacent terminals and in other cases adjacent terminals have integral connecting sections 5 by which adjacent components are interconnected. This terminal strip is in common use. There are other forms which may differ substantially in construction and appearance. In the use of the terminal strips, as shown diagrammatically in Fig. 2, two of the terminal strips 1 are arranged in spaced relation and electric circuit components 6 are arranged crosswise between the terminals 2. With the Fig. 1 terminal strip there will be a row of electric circuit components along both the upper and lower edges of the strips. Lead wires and jumpers will be soldered to the terminals 2 prior to the insertion of the electric circuit components 6.

With hand soldering, as each circuit element was laid in place, it was soldered at opposite ends to the terminals 2. With automatic soldering as indicated in Fig. 3, the components for an entire length of the terminal strips 1 are assembled in the terminals 2 and are mechanically clamped in place, for example, by a clamp **6*a*. In a large assembly, there may be four rows of terminal strips 1, each row containing two or more terminal strips. This makes possible three rows of circuit components 6 along both the top and bottom of the terminal strips 1. With such an arrangement, all of the terminal connections at one of the edges of the terminal strips, either the top or the bottom edge, can be soldered at one time by the apparatus indicated diagrammatically in Fig. 4. In that apparatus there are spaced trackways 7 and 8, each associated with a suitable conveyor chain 9. These trackways are for holding a suitable fixture (not shown) in which the circuit assembly is placed. The trackways 7 and 8 are inclined and ordinarily the holding fixtures will be moved by the chain 9 up the trackway. As the fixture moves up the trackway, it passes over four streams 10 of solder flowing continuously out of nozzles 11 and discharging into a solder pot 12. As is shown more clearly in Fig. 3, the solder is pumped from an intake line 13 below the surface of the solder by a pump 14 to a discharge line 14*a* connected to the nozzle 11. Because the solder is taken from below the surface, it is oxide free. However, as soon as the solder stream 10 issues from the nozzle 11, its surface oxidizes slightly and this small amount of oxide interferes with the soldering. In order to prevent this, there is a pump 15 having its intake connected to a vessel 16 holding flux and having its discharge leading through a control valve 16*a* to a nozzle 17 directed onto the top of the solder stream 10 emerging from the nozzle 11. The flow of flux through the nozzle 17 is very slight but is continuous so that flux is in effect floated on the exposed outer surface of the solder stream 10 in sufficient quantity to prevent any oxidation of the solder stream. Accordingly, as the terminals 2 move up through the solder stream 10, the terminals and the leads of the components 6 in the terminals are fluxed by the flux coating on the outer surface of the solder stream and soldered. This soldering takes place automatically under controlled conditions and the quality of the soldered joint is better than that normally obtained by hand soldering. Because of the use of solder which is entirely oxide free, there is no tendency for the solder to bridge the spaces 4** which would make an unwanted inter-connection.

While the apparatus is shown arranged for soldering four rows of connections, it should be obvious that larger or smaller numbers of rows may be used. In some cases, the rows of connections to be soldered may be so close together that the streams 10 of solder will, in effect, be a continuous sheet. The continuous sheet may be advantageous in making connections to printed wiring panels.

The solder stream is particularly advantageous in making connections to electric components which cannot stand immersion in solder necessary in dip soldering.

It will be noted that the solder streams have a substantial trajectory so as the joints to be soldered are moved through the solder streams along the trajectory, the joints are immersed in the solder long enough to preheat the joints to soldering temperature. Because of the trajectory, the solder streams fall away from the joints after contacting the same. It is accordingly possible to solder assemblies where the circuit components cannot stand contact with solder by holding the assemblies so the solder flows up into contact with the joints and then falls away from the joints without contacting the components. The flux coating on the solder stream eliminates bridging even between conductors spaced as closely as $\frac{1}{16}''$ or less. Apparently the spurs which form as conductors and lifted out of molten solder are due to traces of oxide which cannot exist in the present apparatus because of the flux coating on the solder streams. The apparatus is accordingly adapted to soldering of components to printed circuit panels where the conductors are closely spaced so that bridging is a problem.

What is claimed as new is:

1. The method of making soldered electrical connections between conductors in an assembly having closely spaced joints and for eliminating solder bridging between adjacent joints which comprises holding the conductors together at the joints to be soldered and flowing over the joints a stream of oxide free molten solder having a layer of flux floating on the outer surface of the stream.

2. The method of making soldered electrical connections between conductors in an assembly having closely spaced joints and for eliminating solder bridging between adjacent joints which comprises holding the conductors together at the joints to be soldered and moving the joints through a stream of oxide free molten solder having a layer of flux floating on the outer surface of the stream.

3. The method of soldering a plurality of closely spaced joints and for eliminating solder bridging between adjacent joints which comprises flowing in a horizontal trajectory a stream of oxide free molten solder having a layer of flux floating on the outer surface of the stream, and moving successively the joints to be soldered horizontally through the stream whereby the stream fluxes, preheats and solders the joint.

4. The method of soldering a plurality of closely spaced joints and for eliminating solder bridging between adjacent joints which comprises discharging a stream of oxide free molten solder through a trajectory of appreciable length, said stream having a layer of flux floating on its outer surface, and moving successively the joints to be soldered through the stream along the trajectory whereby the stream fluxes, preheats and solders the joint.

5. The method of soldering an assembly comprising a support carrying a plurality of electrical components and conductors having closely spaced joints to be soldered and for eliminating solder bridging between adjacent joints, which comprises discharging a generally horizontal stream of oxide free molten solder through a trajectory of appreciable length, said stream having a layer of flux floating on its surface and moving the assembly along the trajectory so the joints to be soldered successively intersect the stream whereby the stream preheats and solders the joints.

References Cited in the file of this patent

UNITED STATES PATENTS

| | | |
|---|---|---|
| 1,583,918 | Dunn | May 11, 1926 |
| 1,997,874 | Power | Apr. 16, 1935 |
| 2,022,795 | Vehko | Dec. 3, 1935 |
| 2,161,556 | Carroll | June 6, 1939 |
| 2,321,071 | Ehrhardt et al. | June 8, 1943 |
| 2,389,175 | Woods | Nov. 20, 1945 |
| 2,469,392 | Jones et al. | May 10, 1949 |
| 2,515,097 | Schryber | July 11, 1950 |
| 2,657,458 | Pessel | Nov. 3, 1953 |
| 2,699,403 | Courts | Jan. 11, 1955 |
| 2,740,193 | Pessel | Apr. 3, 1956 |

FOREIGN PATENTS

| | | |
|---|---|---|
| 712,109 | Great Britain | July 11, 1954 |